United States Patent
Park et al.

(10) Patent No.: US 8,118,458 B2
(45) Date of Patent: Feb. 21, 2012

(54) OPTICAL LENS, OPTICAL PACKAGE HAVING THE SAME, BACKLIGHT ASSEMBLY HAVING THE SAME AND DISPLAY DEVICE HAVING THE SAME

(75) Inventors: Se-Ki Park, Suwon-si (KR); Sang-Yu Lee, Yongin-si (KR); Gi-Cherl Kim, Yongin-si (KR); Seok-Hyun Nam, Seoul (KR); Ju-Young Yoon, Suwon-si (JP)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 12/755,199

(22) Filed: Apr. 6, 2010

(65) Prior Publication Data

US 2010/0195316 A1 Aug. 5, 2010

Related U.S. Application Data

(62) Division of application No. 11/369,424, filed on Mar. 7, 2006, now Pat. No. 7,862,221.

(30) Foreign Application Priority Data

Apr. 22, 2005 (KR) .............................. 2005-33364

(51) Int. Cl.
*F21V 5/04* (2006.01)

(52) U.S. Cl. ...... 362/335; 362/268; 362/97.1; 362/97.3; 362/217.02; 362/326; 359/642; 359/708; 359/712; 257/79; 257/81; 257/95; 257/98

(58) Field of Classification Search ............... 362/257, 362/268, 335, 800, 473, 475, 476, 507, 538, 362/97.1, 97.3, 217.02, 326, 544–549; 359/642, 359/708–719; 257/79, 81, 95, 98
See application file for complete search history.

(56) References Cited

U.S. PATENT DOCUMENTS

| 2,224,178 | A | * | 12/1940 | Bitner | 362/337 |
| 6,987,613 | B2 | * | 1/2006 | Pocius et al. | 359/565 |
| 2005/0001537 | A1 | * | 1/2005 | West et al. | 313/500 |
| 2005/0281050 | A1 | * | 12/2005 | Chou | 362/612 |
| 2006/0092644 | A1 | * | 5/2006 | Mok et al. | 362/327 |

FOREIGN PATENT DOCUMENTS

JP 2004-172579 6/2004

OTHER PUBLICATIONS

English Abstract for Publication No. 2004-172579.

* cited by examiner

*Primary Examiner* — Diane Lee
*Assistant Examiner* — Mary Zettl
(74) *Attorney, Agent, or Firm* — F. Chau & Associates, LLC

(57) ABSTRACT

An optical lens refracts and reflects a light to increase a luminance in a top direction of the optical lens and to decrease a luminance in a horizontal direction of the optical lens. The optical lens includes a central portion and a peripheral portion. The central portion has a convex shape. The peripheral portion has a concave shape. The peripheral portion surrounds the central portion. Therefore, power consumption and manufacturing cost are decreased.

19 Claims, 12 Drawing Sheets

OPTICAL LENS, OPTICAL PACKAGE HAVING THE SAME, BACKLIGHT ASSEMBLY HAVING THE SAME AND DISPLAY DEVICE HAVING THE SAME

CROSS-REFERENCE TO RELATED FOREIGN APPLICATION

This application is a divisional of U.S. application Ser. No. 11/369,424, filed on Mar. 7, 2006 now U.S. Pat. No. 7,862,221, which in turn claims priority from Korean Patent Application No. 2005-33364, filed on Apr. 22, 2005, the disclosures of both of which are herein incorporated herein by reference in their entireties.

BACKGROUND OF THE INVENTION

1. Field of the Invention

Embodiments of the present invention relate to an optical lens, an optical package having the optical lens, a backlight assembly having the optical lens and a display device having the optical lens. More particularly, embodiments of the present invention relate to a hybrid-typed optical lens capable of covering a large screen, an optical package having the optical lens, a backlight assembly having the optical lens and a display device having the optical lens.

2. Description of the Related Art

A liquid crystal display (LCD) device, in general, displays an image using optical and electrical characteristics of liquid crystals. The LCD device is a non-emissive typed display device, which requires a light source. The LCD device displays the image using an externally provided light or an internally provided light from a light source in the LCD device.

An exemplary light source includes a cold cathode fluorescent lamp (CCFL), a flat fluorescent lamp (FFL), a light emitting diode (LED), etc.

The LED is essentially a point light source that has poor luminance uniformity. In order to increase the luminance uniformity of the LED, an optical lens covers the LED.

Optical lenses for covering the LED are classified into top illumination typed optical lenses and side illumination typed optical lenses. When the top illumination typed optical lens covers the LED, a luminance of the light source is increased. However, the luminance uniformity of the light source having the top illumination typed optical lens is decreased. When the side illumination typed optical lens covers the LED, the luminance uniformity of the light source is increased. However, a portion of the light generated from the LED may leak from the side illumination typed optical lens.

As a screen size of the LCD device is increased, the number of the light emitting diodes is increased. However, when the number of the light emitting diodes is increased, a power consumption and a manufacturing cost of the LCD device are increased.

In addition, size and thickness of the LCD device are also increased, as the number of the light emitting diodes is increased.

SUMMARY OF THE INVENTION

An embodiment of the present invention provides a hybrid-typed optical lens capable of covering a large screen.

An embodiment of the present invention also provides an optical package having the above-mentioned optical lens.

An embodiment of the present invention also provides a backlight assembly having the above-mentioned optical lens.

An embodiment of the present invention also provides a display device having the above-mentioned optical lens.

An optical lens in accordance with an embodiment of the present invention refracts and reflects a light to increase a luminance in a top direction of the optical lens and to decrease a luminance in a horizontal direction of the optical lens. The optical lens includes a central portion and a peripheral portion. The central portion has a convex shape. The peripheral portion has a concave shape. The peripheral portion surrounds the central portion.

An optical package in accordance with an embodiment of the present invention includes a light emitting member and an optical lens. The light-emitting member generates a light. The optical lens refracts and reflects the light to increase a luminance in a top direction of the optical lens and to decrease a luminance in a horizontal direction of the optical lens. The optical lens includes a central portion and a peripheral portion. The central portion has a convex shape. The peripheral portion has a concave shape. The peripheral portion surrounds the central portion.

A backlight assembly in accordance with an embodiment of the present invention includes a substrate, a light emitting diode, an optical lens and a reflecting plate. The light emitting diode is on the substrate to generate a light. The optical lens refracts and reflects the light to increase a luminance in a top direction of the optical lens and to decrease a luminance in a horizontal direction of the optical lens. The optical lens includes a central portion and a peripheral portion. The central portion has a convex shape. The peripheral portion has a concave shape. The peripheral portion surrounds the central portion. The reflecting plate is interposed between the light emitting diode and the optical lens to reflect a portion of the light leaked from the optical lens.

A display device in accordance with an embodiment of the present invention includes a display panel and a backlight assembly. The display panel displays an image using a light. The backlight assembly includes a light emitting diode and an optical lens. The light emitting diode generates a light. The optical lens refracts and reflects the light to increase a luminance in a top direction of the optical lens and to decrease a luminance in a horizontal direction of the optical lens. The optical lens includes a central portion having a convex shape, and a peripheral portion having a concave shape.

According to an embodiment of the present invention, the optical lens of the button type is a hybrid typed optical lens having a top illumination type and a side illumination type where the area covered by the one LED is increased. Therefore, the power consumption and a manufacturing cost of the backlight assembly are decreased, although the display device has the large screen.

DETAILED DESCRIPTION OF THE EXEMPLARY EMBODIMENTS

Embodiments of the invention are described more fully hereinafter with reference to the accompanying drawings, in which embodiments of the invention are shown. This invention may, however, be embodied in many different forms and should not be construed as limited to the embodiments set forth herein.

Hereinafter, embodiments of the present invention will be described in detail with reference to the accompanying drawings.

Figure 1:
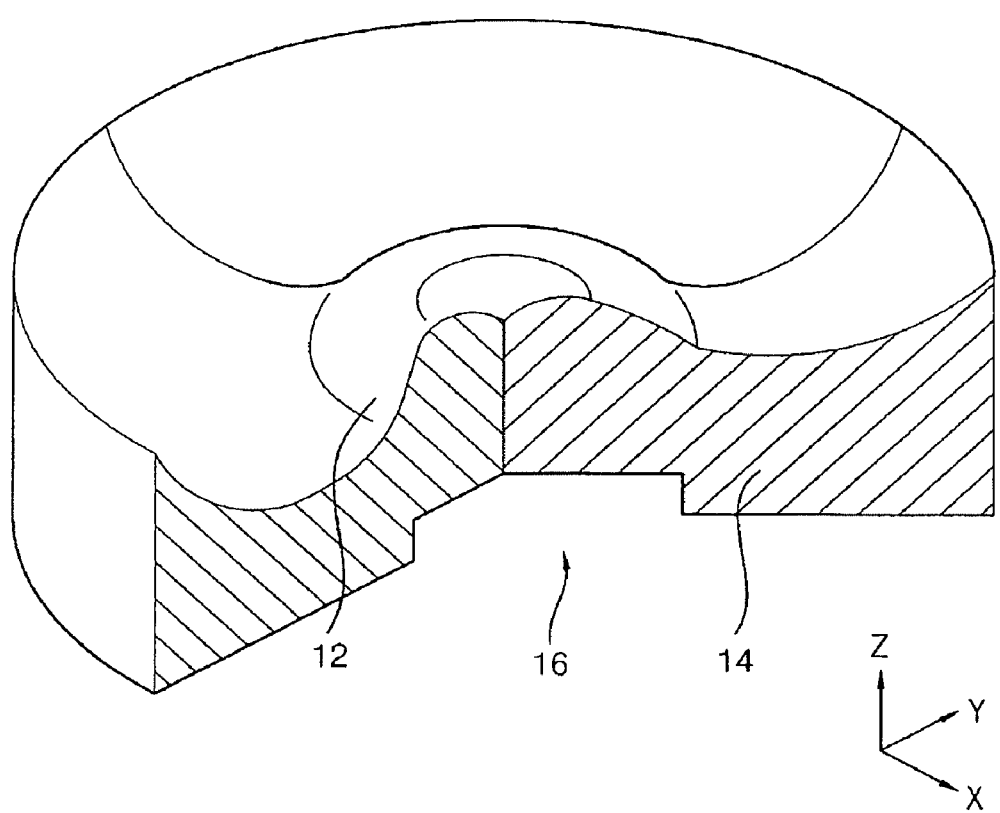
FIG. 1 is a perspective view showing an optical lens of a button type in accordance with an embodiment of the present invention.
Figure 2:
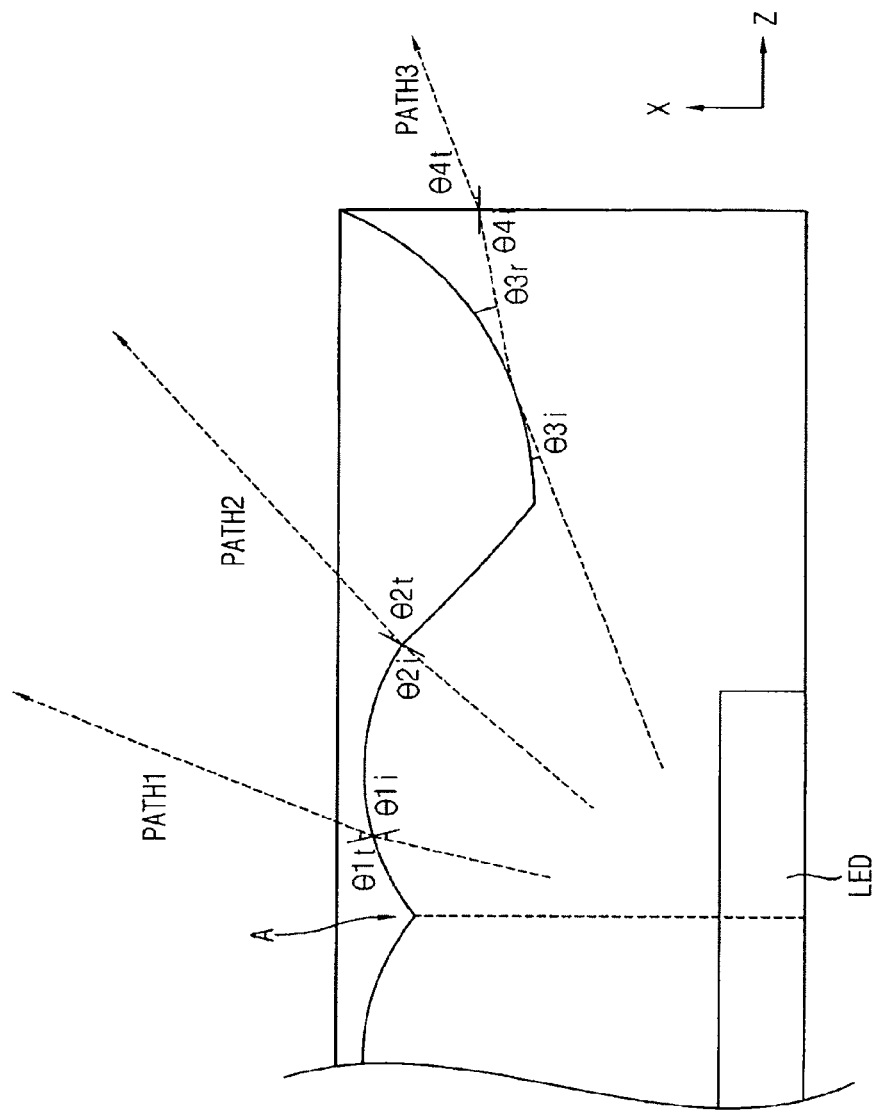
FIG. 2 is a cross-sectional view showing a light path through the optical lens shown in FIG. 1.

FIG. 1 is a perspective view showing an exemplary optical lens of a button type in accordance with an embodiment of the present invention. FIG. 2 is a cross-sectional view showing a light path through the exemplary optical lens shown in FIG. 1.

Referring to FIGS. 1 and 2, the optical lens 10 of the button type includes a central portion 12 and a peripheral portion 14. A recess 16 is formed on a bottom surface of the central portion 12 to receive a light-emitting element such as a light emitting diode (LED). The recess 16 has a shape corresponding to the light-emitting element. A light generated from the light emitting element is incident into the optical lens 10 so that a central light exits from surfaces of the central portion 12 and a peripheral light exits from surfaces of the peripheral portion 14. The light incident into the optical lens 10 is refracted and reflected where an intensity of the central light is decreased, and an intensity of the peripheral light is increased, thereby increasing a luminance uniformity. That is, the optical lens 10 increases the luminance in the top direction, and decreases the luminance in the horizontal direction. When a size of the optical lens 10 is increased, an area covered by the optical lens 10 is increased.

The central portion 12 has a convex shape protruded in a top direction (z-direction). The central portion 12 has a substantially circular shape when viewed on a plane (x-y plane). The central portion 12 is defined by a plurality of curved surfaces having various curvatures. For example, the central portion 12 may function as a convex lens. Contour lines of the central portion 12 may be substantially parallel with each other. Alternatively, the contour lines of the central portion 12 may be shifted toward a predetermined direction. That is, a portion of the contour lines may be denser than a remaining portion of the contour lines.

The peripheral portion 14 has a concave shape to receive the central portion 12, and surrounds the central portion 12. In particular, the peripheral portion 14 has the concave shape in the top direction (z-direction). The peripheral portion 14 may have a substantially donut shape surrounding the central portion 12 when viewed on the plane (x-y plane). The peripheral portion 14 is defined by a plurality of curved surfaces having various curvatures. The peripheral portion 14 may function as a concave lens. Contour lines of the peripheral portion 14 may be substantially parallel with each other. Alternatively, the contour lines of the peripheral portion 14 may be shifted toward a predetermined direction. That is, a portion of the contour lines may be denser than a remaining portion of the contour lines.

The central portion 12 may be integrally formed with the peripheral portion 14. For example, the optical lens 10 includes a polymethylmethacrylate (PMMA) based resin. A refractive index of the PMMA based resin is about 1.5.

Referring again to FIG. 2, a first light path PATH1 and a second light path PATH2 are depicted in the central portion 12. The central portion 12 guides the first and second light paths PATH1 and PATH2 to diffuse the light exiting from the surface of the central portion 12.

In particular, a first exiting angle $\theta 1t$ of the first light path PATH1 is greater than a first incident angle $\theta 1i$ of the first light path PATH1. In Snell's law, the central portion 12 has a greater refractive index than an air so that the first light path PATH1 is refracted to diffuse the light exiting from the surface of the central portion 12, thereby increasing the first exiting angle $\theta 1t$.

In addition, a second exiting angle $\theta 2t$ of the second light path PATH2 is greater than a second incident angle $\theta 2i$ of the second light path PATH2.

A luminance of the light generated from a central portion of the LED is greater than that of the light generated from a peripheral portion of the LED. In order to increase the luminance uniformity, the shape of the optical lens 10 is adjusted to decrease the luminance of the light generated from the central portion of the LED, and to increase the luminance of the light generated from the peripheral portion of the LED. In FIG. 2, the central portion 12 has a V-shaped recess to decrease the luminance of the light generated from the central portion of the LED, and to increase the luminance of the light generated from the peripheral portion of the LED.

A light passing through the third light path PATH3 is totally reflected from the concave surface of the peripheral portion 14, and exits from a side surface of the optical lens 10. That is, when the light is irradiated onto the concave surface of the peripheral portion 14 at a third incident angle $\theta 3i$, the light is then totally reflected from the concave surface of the peripheral portion 14 at a reflection angle $\theta 3r$ that is substantially same as the third incident angle $\theta 3i$. The reflected light is irradiated onto the side surface of the optical lens 10 at a fourth incident angle $\theta 4i$ to exit from the side surface at a fourth exiting angle $\theta 4t$.

The first and second light paths PATH1 and PATH2 correspond to a top emission typed optical lens. The third light path PATH3 corresponds to a side emission typed optical lens. Therefore, the optical lens 10 of FIGS. 1 and 2 has a hybrid typed optical lens having the top and side emission typed optical lenses.

Figure 3:
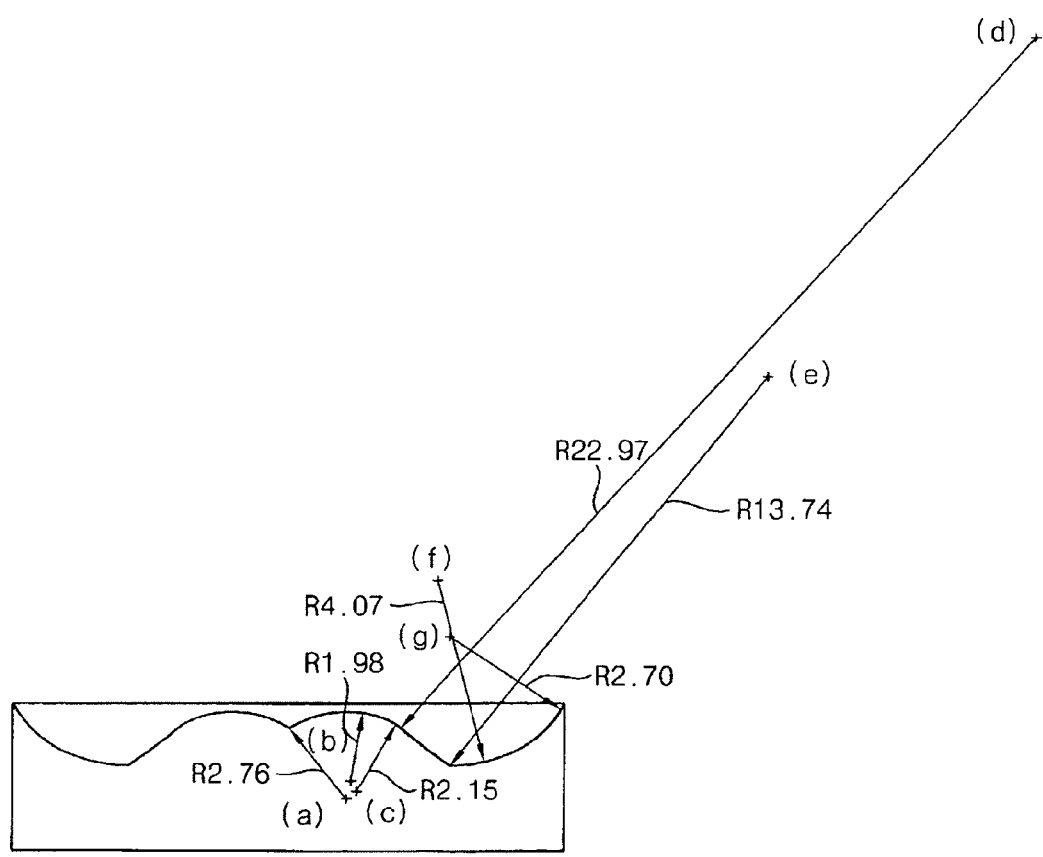
FIG. 3 is a cross-sectional view showing a curvature of the optical lens shown in FIG. 1.

FIG. 3 is a cross-sectional view showing a curvature of the exemplary optical lens shown in FIG. 1.

Referring to FIGS. 1 to 3, the central portion 12 has the convex shape having the recess on a center of the central portion 12. The convex shape having the recess is defined by the curved surfaces having various curvatures.

For example, the central portion 12 includes a first curved surface, a second curved surface, a third curved surface, a fourth curved surface and a fifth curved surface. The first curved surface is on the center of the central portion 12, and has a first radius of curvature of about 2.76 mm. A center of the first radius of curvature is under the first curved surface. That is, the first curved surface is protruded toward a front of the optical lens 10. The second curved surface is adjacent to the first curved surface and connected to the first curved surface, and has a second radius of curvature of about 1.98 mm. A center of the second radius of curvature is under the second curved surface. The third curved surface is adjacent to the second curved surface and connected to the second curved surface, and has a third radius of curvature of about 2.15 mm. A center of the third radius of curvature is under the third curved surface. The fourth curved surface is adjacent to the third curved surface and connected to the third curved surface, and has a fourth radius of curvature of about 4.07 mm. A center of the fourth radius of curvature is on the fourth curved surface. That is, the fourth curvature is protruded toward a rear of the optical lens 10. The fifth curved surface is adjacent to the fourth curved surface and connected to the fourth curved surface, and has a fifth radius of curvature of about 22.97 mm. A center of the fifth radius of curvature is on the fifth curved surface. The first, second, third, fourth and fifth curved surfaces define the convex shape having the recess. Note that the radii presented in this paragraph are exemplary and non-limiting, and other radii of curvature are within the scope of an embodiment of the invention.

The peripheral portion 14 includes a sixth curved surface and a seventh curved surface. The sixth curved surface is adjacent to the fifth curved surface and connected to the fifth curved surface, and has a sixth radius of curvature of about 13.74 mm. A center of the sixth radius of curvature is on the sixth curved surface. The seventh curved surface is adjacent to the sixth curved surface and connected to the sixth curved surface, and has a seventh radius of curvature of about 2.70 mm. A center of the seventh radius of curvature is on the seventh curved surface. The sixth and seventh curved surfaces define the concave shape. Note that the radii presented in this paragraph are exemplary and non-limiting, and other radii of curvature are within the scope of an embodiment of the invention.

In FIGS. 1 to 3, the recess is formed on the center of the central portion 12. Alternatively, the recess may not be formed on the center of the central portion 12.

In FIGS. 1 to 3, one LED corresponds to one optical lens 10. Alternatively, a plurality of light emitting diodes may correspond to one optical lens.

Figure 4:
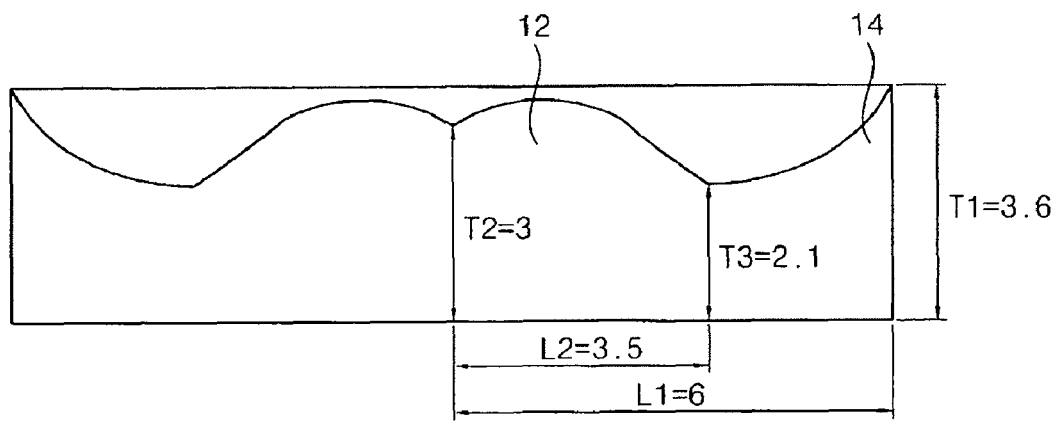
FIG. 4 is a cross-sectional view showing a size of the optical lens shown in FIG. 1.

FIG. 4 is a cross-sectional view showing an exemplary, non-limiting size of the optical lens shown in FIG. 1.

Referring to FIG. 4, a radius L1 of the optical lens 10 may be about 6 mm, and a maximum height T1 of the optical lens 10 may be about 3.6 mm. In addition, a maximum height T2 of the central portion 12 may be about 3 mm.

A radius L2 of the central portion 12 may be about 3.5 mm. A height T3 of a boundary between the central and peripheral portions 12 and 14 may be about 2.1 mm. The height T3 of the boundary is a minimum height of the optical lens 10. The maximum height T2 of the central portion 12 is smaller than the maximum height T1 of the optical lens 10.

A height of an outmost portion of the peripheral portion 14 is the maximum height T1 of the optical lens 10. A size of the optical lens 10 may be changed. The radius L1 and the maximum height T1 of the optical lens 10, the radius L2 and the maximum height T2 of the central portion 12, and the height T3 of the boundary may be substantially proportional to each other. For example, when the size of the optical lens 10 is increased, the radius L1 and the maximum height T1 of the optical lens 10, the radius L2 and the maximum height T2 of the central portion 12, and the height T3 of the boundary may also be increased.

Figure 5A:
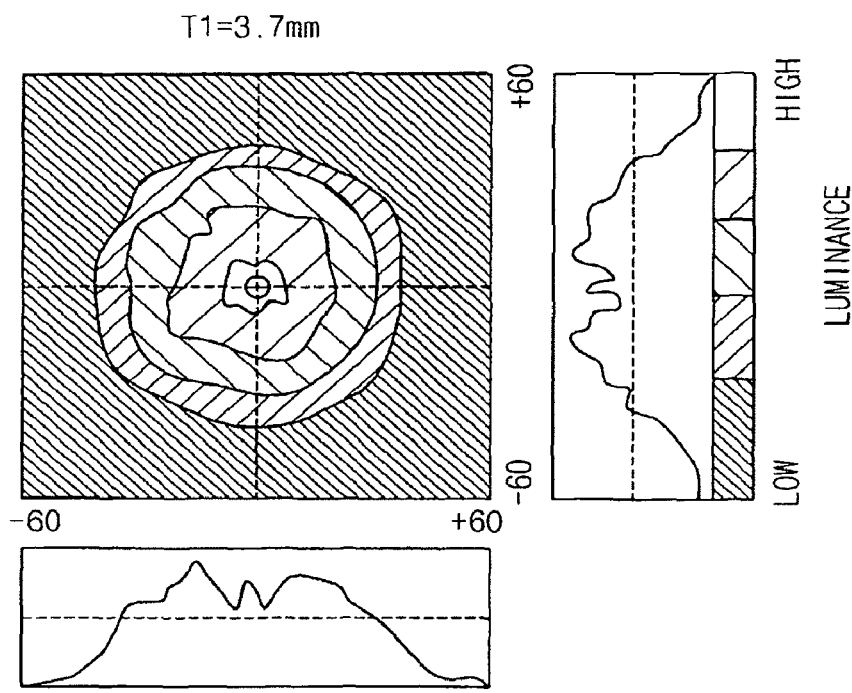
FIGS. 5A to 5C are images showing optical simulations of the optical lens having various thicknesses.
Figure 5B:
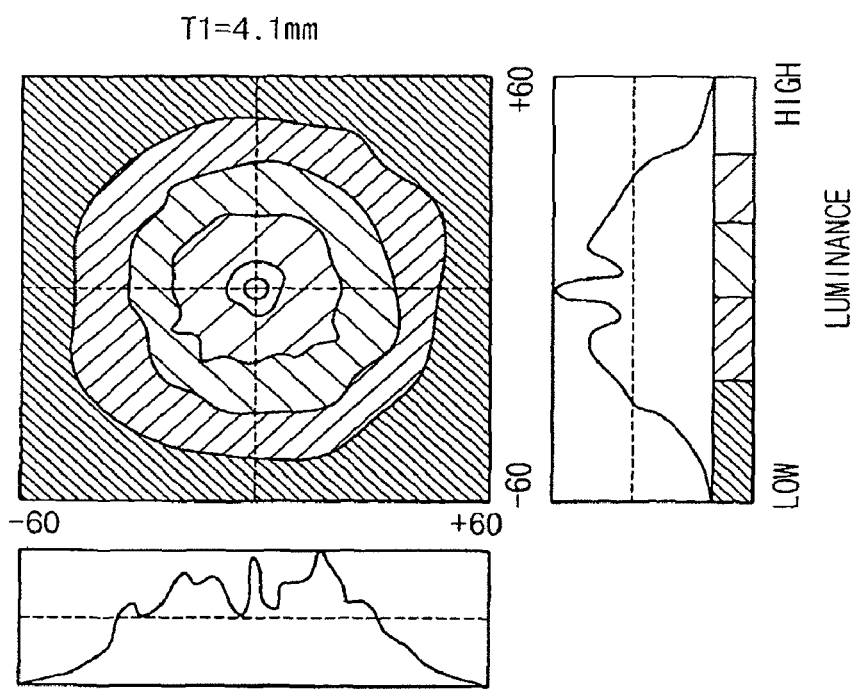
Figure 5C:
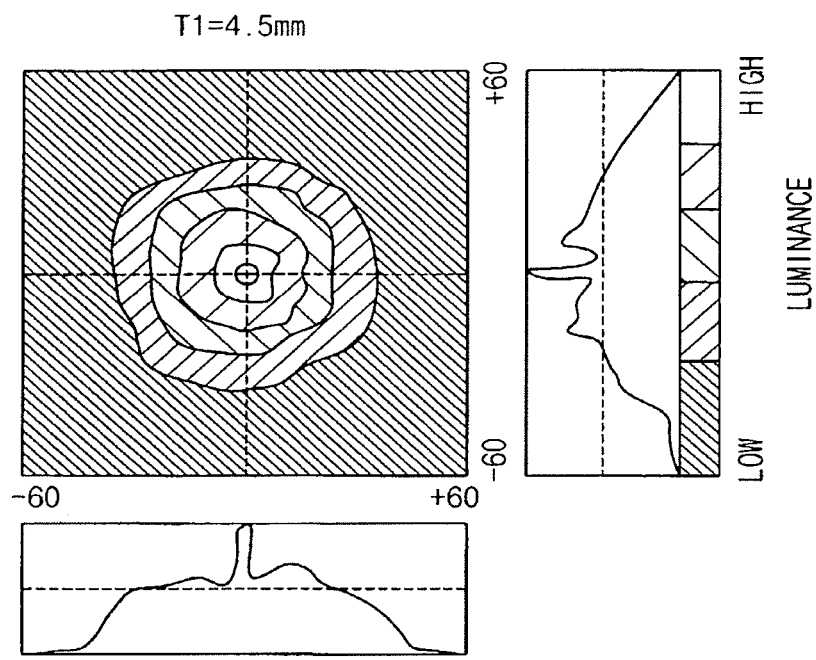

FIGS. 5A to 5C are images showing optical simulations of exemplary 211 optical lenses having various thicknesses. The maximum thickness of the optical lens shown in FIG. 5A is about 3.7 mm. The maximum thickness of the optical lens shown in FIG. 5B is about 4.1 mm. The maximum thickness of the optical lens shown in FIG. 5C is about 4.5 mm.

Referring to FIGS. 5A to 5C, the optical lens having the maximum thickness of about 3.7 mm has a substantially same optical distribution as the optical lens having the maximum thickness of about 4.1 mm. However, when the maximum thickness of the optical lens is more than about 4.5 mm, a light extraction of a center of the optical lens is decreased, thereby decreasing a luminance on the center of the optical lens.

Figure 6:
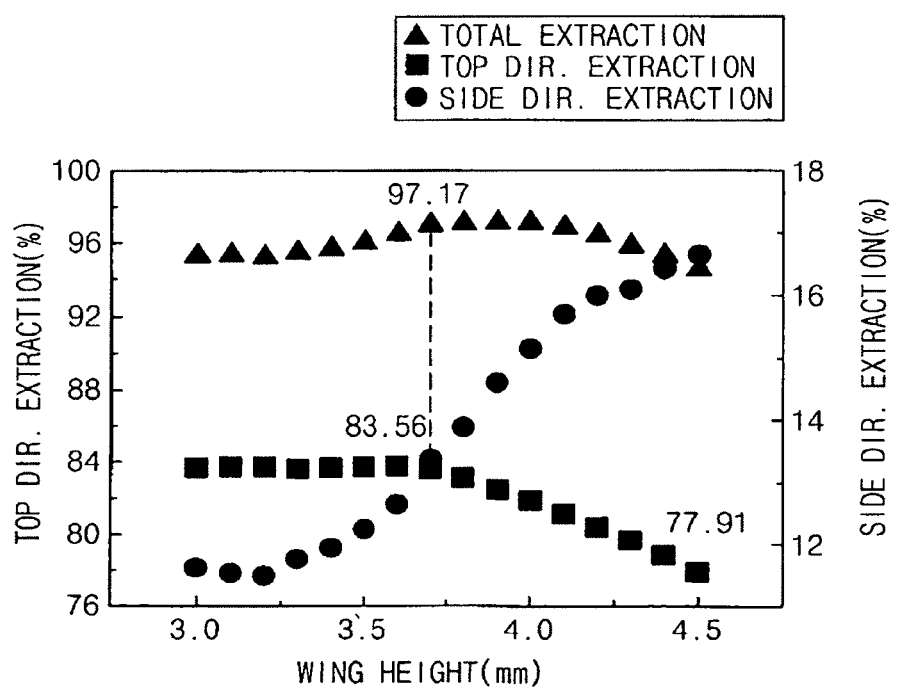
FIG. 6 is a graph showing a relationship between a light extraction and a height of a wing of the optical lens shown in FIG. 1.

FIG. 6 is a graph showing a relationship between a light extraction and a maximum height of a central portion of the exemplary optical lens shown in FIG. 1. Light extractions of a top direction (z-direction) and a side direction (x-y direction) are shown in FIG. 6.

Referring to FIG. 6, when the maximum height of the central portion is about 3.0 mm, the light extractions in the top direction and the side direction are about 84% and about 12%, respectively, and an average light extraction of the optical lens is about 96%. When the maximum height of the central portion is about 3.55 mm, the light extractions in the top direction and the side direction are about 83.56% and about 13.61%, respectively, and an average light extraction of the optical lens is about 97.17%.

In FIG. 6, a light leakage from the optical lens is no more than about 3% so that the optical lens may be optimized to a backlight assembly.

When the maximum height of the central portion is about 4.5 mm, the light extractions in the top direction and the side direction are about 77.91% and about 16.2%, respectively, and an average light extraction of the optical lens is about 94.11%.

When the maximum height of the central portion is about 4.5 mm, the optical lens can also be used for the backlight assembly, although the light leakage from the optical lens is about 5.89% that is negligible.

When the maximum height of the central portion is about 3.7 mm, the light extractions are maximized. In FIG. 6, variations of the light extractions of the optical lens having the maximum height of the central portion of no more than about 3.7 mm may be negligible.

Figure 7:
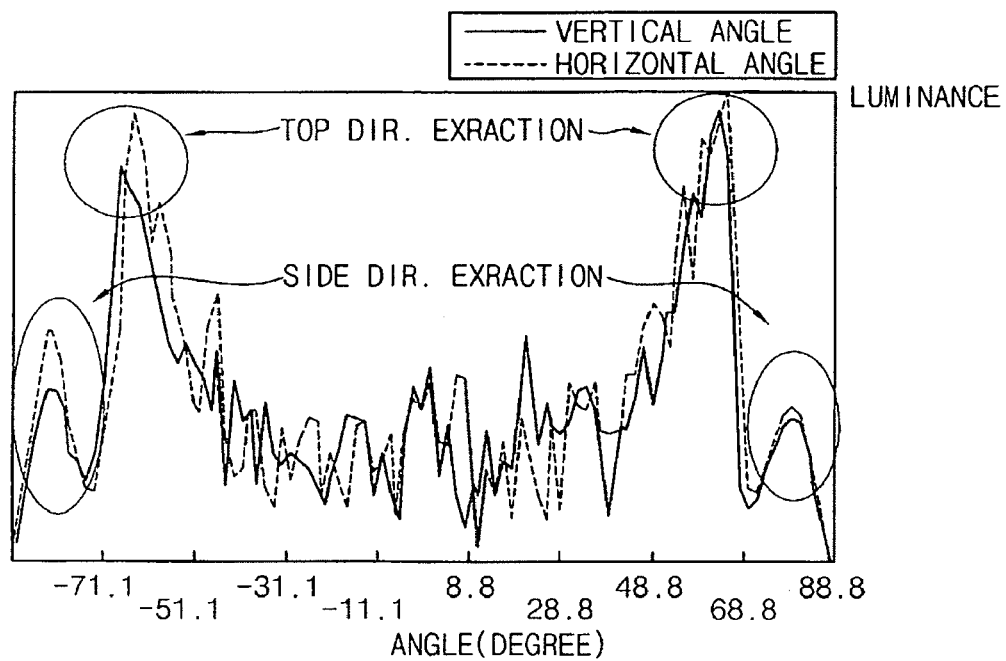
FIG. 7 is a graph showing a relationship between an orientation angle and a light extraction of the optical lens shown in FIG. 1.

FIG. 7 is a graph showing a relationship between an orientation angle and a light extraction of the exemplary optical lens shown in FIG. 1. In particular, orientation angles in a top direction and a horizontal direction are shown in FIG. 7.

Referring to FIG. 7, the orientation angle of the optical lens in the top direction is from about −60° to about +60°. An orientation angle in the top direction of an optical lens of a bowl type is from about −50° to about +50°. Therefore, the optical lens shown in FIG. 1 diffuses the light in a wider range than the optical lens of the bowl type.

The orientation angle of the optical lens in the side direction is from about −80° to about +80°. The light exiting from the optical lens in the side direction may have a substantially same luminance as the light exiting from the optical lens in the top direction corresponding to the orientation angle of about −50° or about +50°.

The light passes through the optical lens of the button type shown in FIG. 1 in the top direction and the side direction so that the optical lens may be a hybrid typed optical lens.

Figure 8:
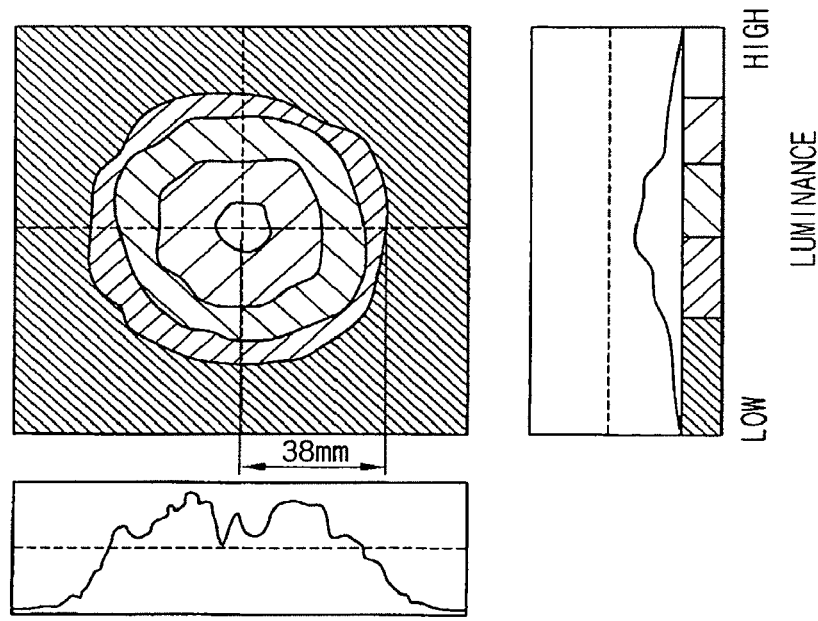
FIG. 8 is an image showing an optical simulation of the optical lens shown in FIG. 1 when an optical system of the optical lens is about 20 mm.

FIG. 8 is an image showing an optical simulation of the exemplary optical lens shown in FIG. 1 when an optical system of the optical lens is about 20 mm. Light extractions in the top direction and the horizontal direction are shown in FIG. 8.

Referring to FIG. 8, the optical lens covers an area having a radius of about 38 mm. When an optical system of the optical lens of the bowl type is about 20 mm, the optical lens of the bowl type is about 20 mm. Therefore, the radius of the region covered by the optical lens shown in FIG. 1 is greater than that of the region covered by the optical lens of the bowl type by about 90%.

Hereinafter, the optical lens having the bowl shape is described.

Figure 9:
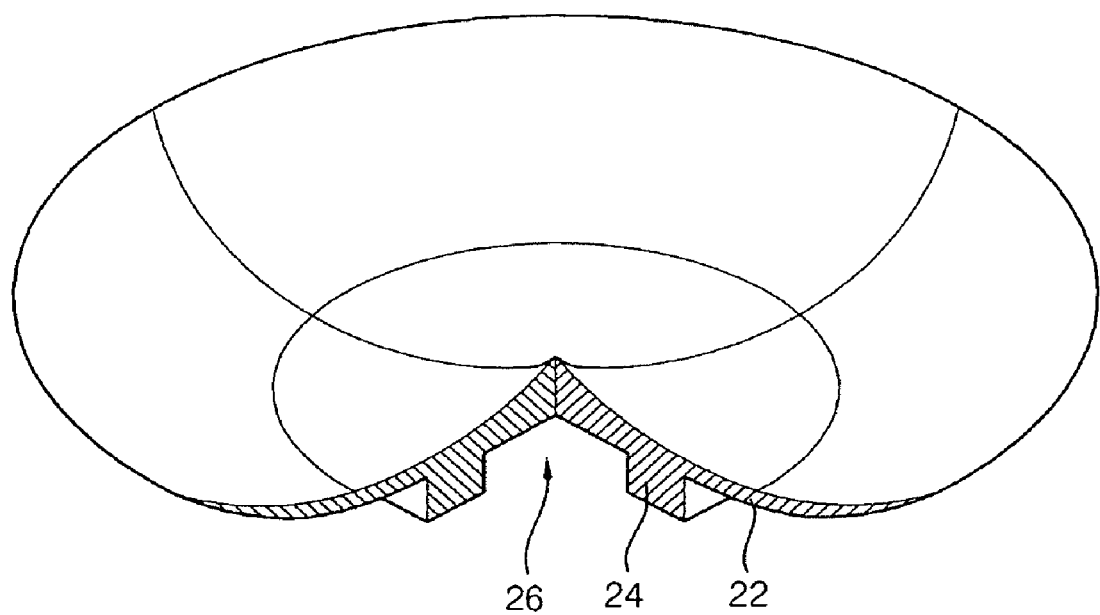
FIG. 9 is a perspective view showing an optical lens of a bowl type in accordance with another embodiment of the present invention.
Figure 10:
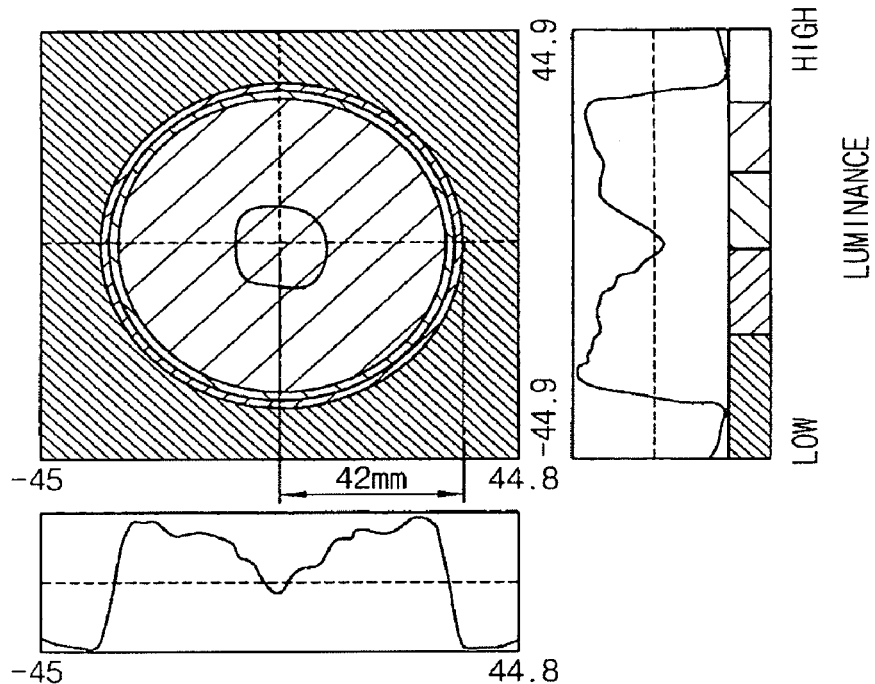
FIG. 10 is an image showing an optical simulation of the optical lens shown in FIG. 9.

FIG. 9 is a perspective view showing an optical lens of a bowl type in accordance with another embodiment of the present invention. FIG. 10 is an image showing an optical simulation of the optical lens shown in FIG. 9. A distance between the optical lens of the bowl type and a light sensor is about 40 mm, and an angle for sensing the light is about 70°.

Referring to FIGS. 9 and 10, a center of the optical lens 20 of the bowl type is protruded. Reference numerals 22 and 24 represent a wing portion and a guiding portion of the optical lens 20 of the bowl type, respectively. A recess 26 is formed on the guiding portion 24 to receive an LED.

Referring again to FIG. 10, the optical lens 20 of the bowl type optically covers an area having a radius of about 42 mm. A luminance is rapidly decreased in a remaining area that is not covered by the optical lens 20 of the bowl type. In addition, a luminance of a central portion of the optical lens 20 of the bowl type is smaller than that of a peripheral portion of the optical lens 20 of the bowl type.

Figure 11:
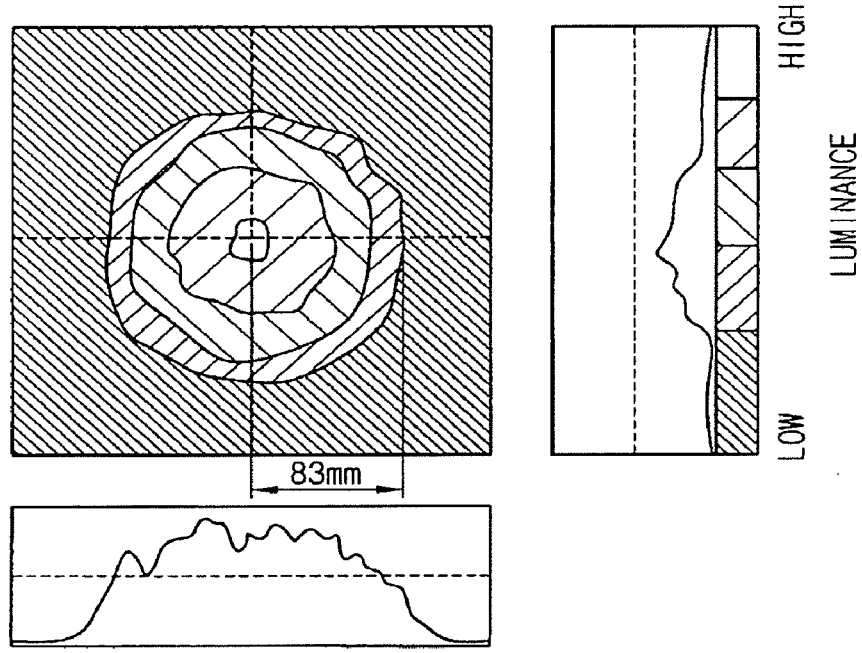
FIG. 11 is an image showing an optical simulation of the optical lens shown in FIG. 1 when an optical system of the optical lens is about 40 mm.

FIG. 11 is an image showing an optical simulation of the exemplary optical lens shown in FIG. 1 when an optical system of the optical lens is about 40 mm. Luminances in the top direction and the horizontal direction are shown in FIG. 11.

Referring to FIG. 11, the optical lens shown in FIG. 1 optically covers an area having a radius of about 83 mm. The area covered by the optical lens shown in FIG. 1 is greater than the area covered by the optical lens shown in FIG. 9 by about 97%. In addition, a radius of the optical lens shown in FIG. 9 is about 20 mm, and a radius of the optical lens shown in FIG. 1 is about 6 mm. That is, the area covered by the optical lens shown in FIG. 1 is increased although the radius of the optical lens shown in FIG. 1 is decreased.

Therefore, the optical lens of the button type shown in FIG. 1 optically covers the large area so that a large screen display device may include the optical lens of the button type shown in FIG. 1.

Figure 12:
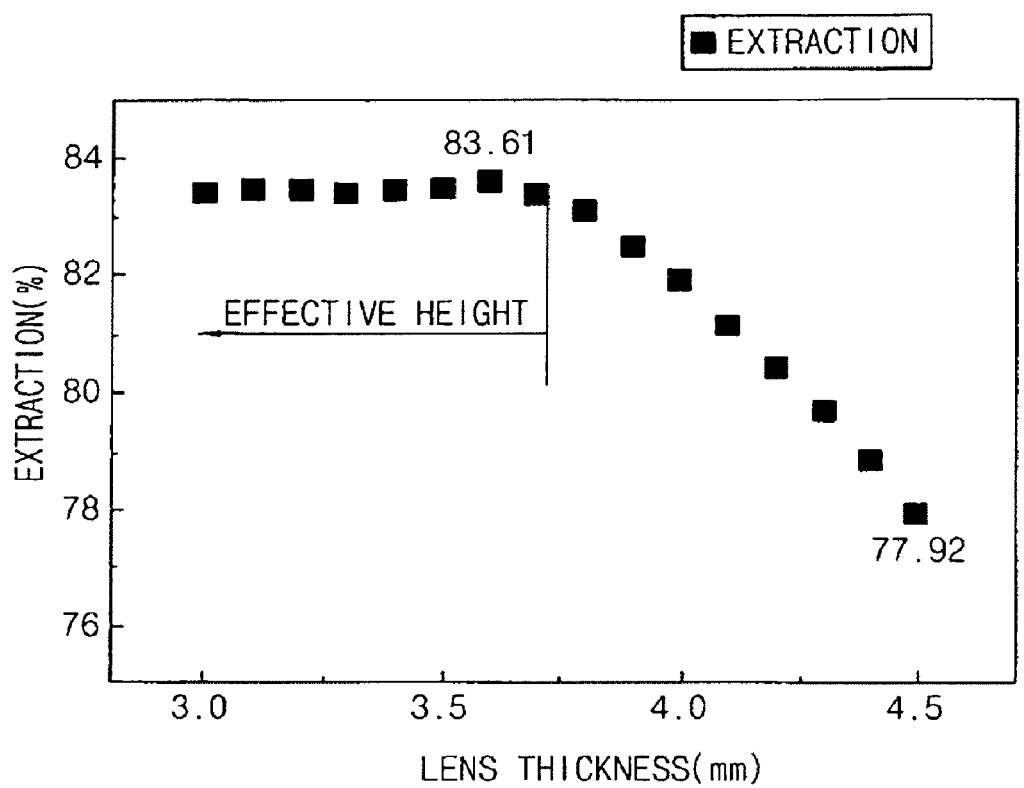
FIG. 12 is a graph showing a relationship between a light extraction and a thickness of the optical lens shown in FIG. 1.

FIG. 12 is a graph showing a relationship between a light extraction and a thickness of the optical lens shown in FIG. 1.

Referring to FIG. 12, a maximum height of the optical lens of the button type shown in FIG. 1 is about 3.7 mm. When the maximum height of the optical lens is no more than about 3.7 mm, the light extraction may be negligible. That is, the maximum height of the optical lens may be changed to be no more than about 3.7 mm.

According to an embodiment of the invention, an optical lens of the button type is a hybrid-typed optical lens having a side illumination type and a top illumination type. That is, the light extraction and the luminance uniformity of the optical lens of the button type are increased.

In addition, the area covered by the optical lens of the button type is greater than the area covered by the bowl type by about 97%. The light leakage of the optical lens of the button type is substantially same as the light leakage of the optical lens of the bowl type so that the light leakage of the optical lens of the button type is negligible.

Figure 13:
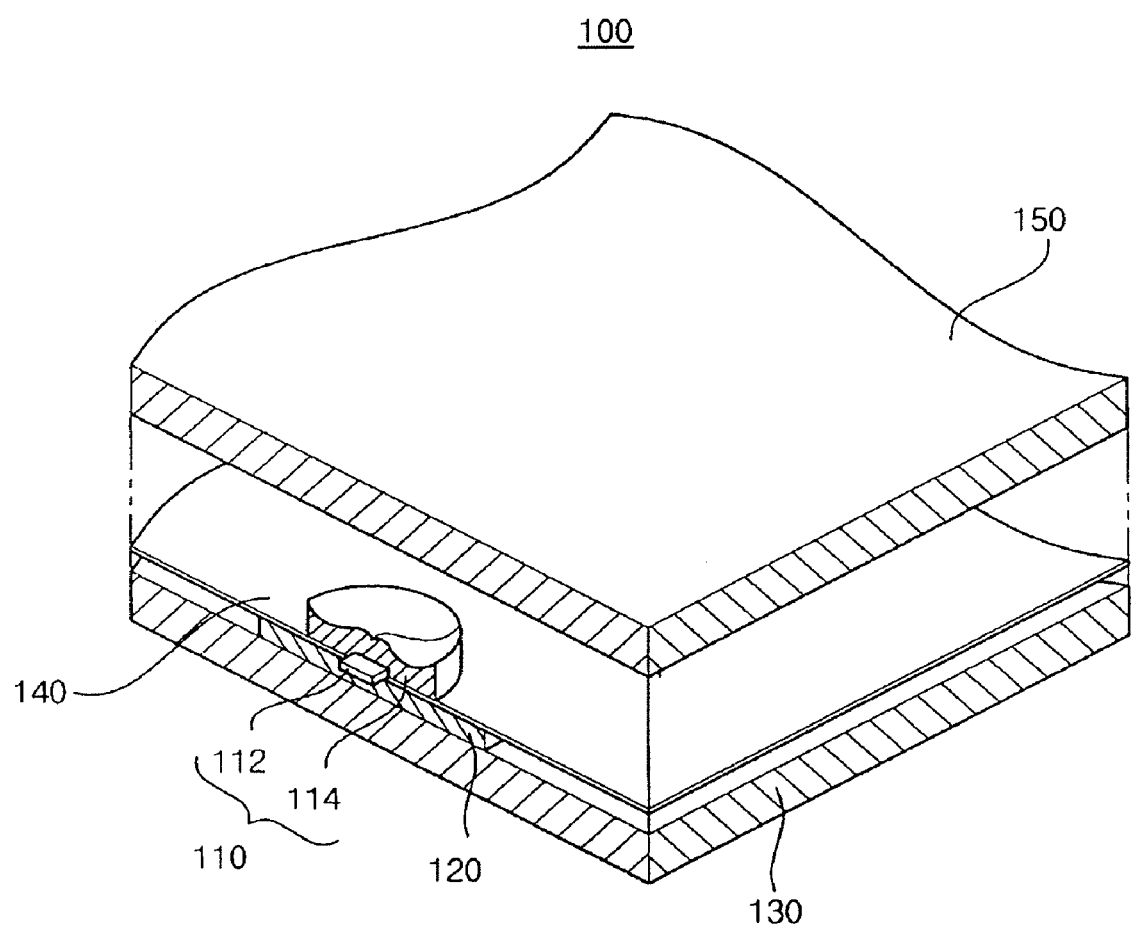
FIG. 13 is a partial cutout perspective view showing a backlight assembly in accordance with an embodiment of the present invention.

FIG. 13 is a partially cutout perspective view showing a backlight assembly in accordance with an embodiment of the present invention.

Referring to FIG. 13, the backlight assembly 100 includes an optical package 110, a power supply substrate 120, a receiving container 130, a reflecting plate 140 and a light-mixing member 150. The power supply substrate 120 supports the optical package 110. The receiving container 130 supports the power supply substrate 120. The reflecting plate 140 is interposed between the power supply substrate 120 and the optical package 110. The light-mixing member 150 is on the optical package 110.

The optical package 110 includes a light emitting diode (LED) 112 and an optical lens 114 of a button type, according to an embodiment of the invention. The optical lens 114 of the button type includes a central portion and a peripheral portion. The central portion of the optical lens 114 has a convex shape. The central and peripheral portions define a button shape. A light generated from the LED 112 is incident into the optical lens 114 so that a central light and a peripheral light exiting from surfaces of the central and peripheral portions of the optical lens 114. The light incident into the optical lens 114 is refracted and reflected so that an intensity of the central light is decreased, and an intensity of the peripheral light is increased, thereby increasing a luminance uniformity.

The power supply substrate 120 supports the optical package 110 to supply the LED 112 with an electric power.

The receiving container 130 receives the optical package 110, the power supply substrate 120 and the light-mixing member 150. The receiving container 130 may include a bottom plate and a sidewall.

The reflecting plate 140 is interposed between the power supply substrate 120 and the optical package 110. A portion of the light leaked from the optical lens 114 is reflected from the reflecting plate 140 toward the light-mixing member 150. The reflecting plate 140 may be a solid plate. Alternatively, the reflecting plate 140 may be a flexible sheet.

The light-mixing member 150 is on the optical package 110 to increase a luminance when viewed in a top direction and a luminance uniformity. The light-mixing member 150 may include a plurality of diffusion particles.

Figure 14:
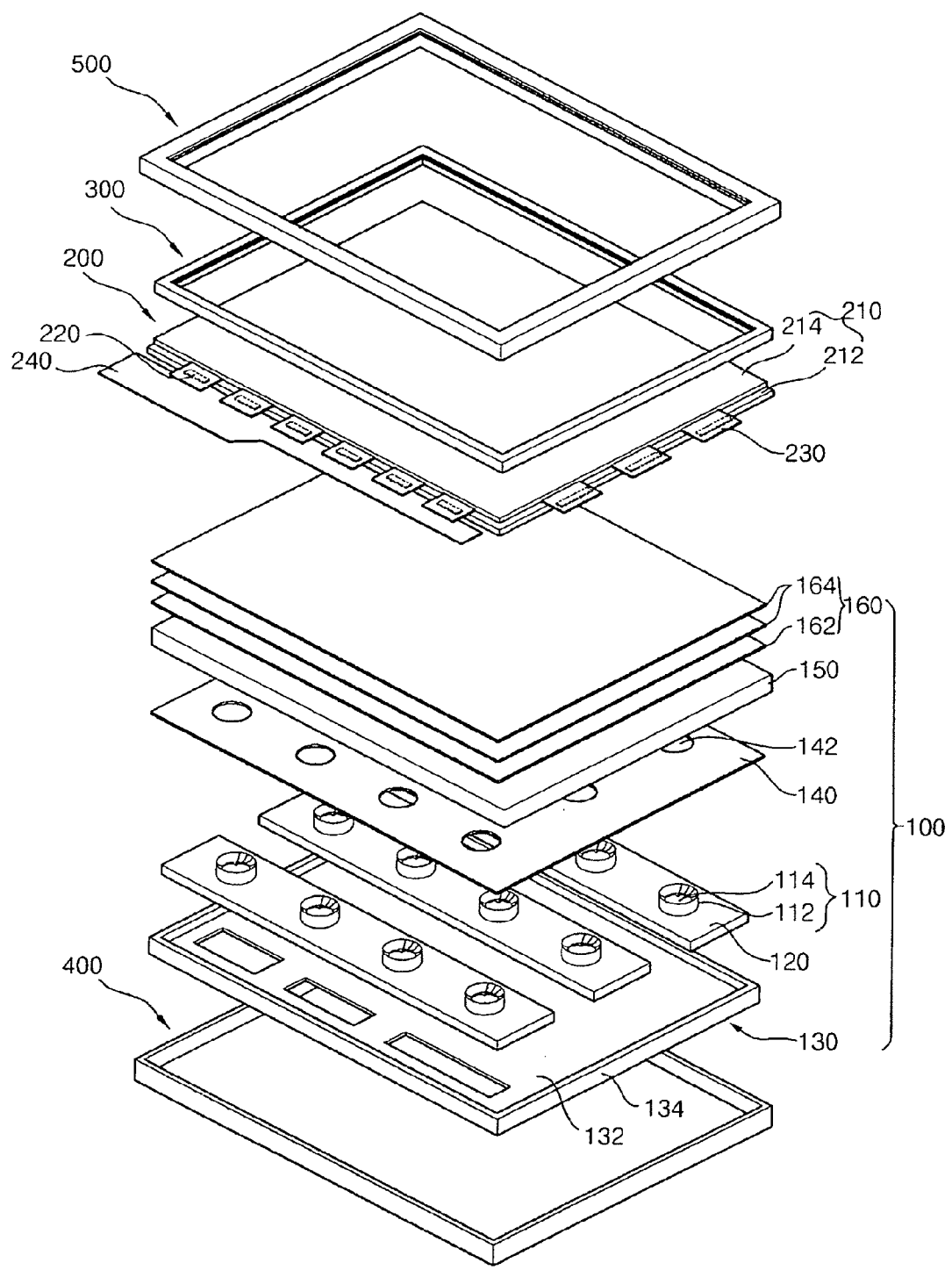
FIG. 14 is an exploded perspective view showing a display device in accordance with an embodiment of the present invention.

FIG. 14 is an exploded perspective view showing a display device in accordance with an embodiment of the present invention.

Referring to FIG. 14, the display device includes a backlight assembly 100, a display unit 200, a top chassis 300, a rear case 400 and a front case 500.

The backlight assembly 100 includes a plurality of optical packages 110, a power supply substrate 120, a receiving container 130, a reflecting plate, a light mixing member 150 and optical sheets 160. The power supply substrate 120 supports the optical packages 110. The receiving container 130 supports the power supply substrate 120. The reflecting plate 140 is interposed between the power supply substrate 120 and the optical package 110. The light-mixing member 150 is on the optical package 110. The backlight assembly of FIG. 14 is same as in FIG. 13. Thus, the same reference numerals will be used to refer to the same or like parts as those described in FIG. 13 and any further explanation concerning the above elements will be omitted.

The optical packages 110 are on the power supply substrate 120. For example, each of the optical packages 110 generates a white light. Alternatively, the optical packages 110 may generate a red light, a green light and a blue light, respectively, or a combination thereof.

A portion of the light generated from the optical packages 110 is reflected from the reflecting plate 140 toward the light mixing member 150.

The light mixing member 150 is on the optical packages 110. The light generated from the optical packages 110 and reflected from the reflecting plate 140 is mixed in an air layer on the optical packages 110 by the optical packages 110. For example, the light mixing member 150 mixes the red, green and blue lights generated from the optical packages 110.

The optical sheets 160 include a diffusion sheet 162 and a prism sheet 164. The diffusion sheet 162 diffuses the light having passed through the optical package 110. The prism sheet 164 increases the luminance when viewed in a top direction. The prism sheet 164 may include a brightness enhancement film (BEF), a dual brightness enhancement film (DBEF), etc.

The receiving container 130 includes a bottom plate 132 and a sidewall 134. The bottom plate 132 has an opening. The sidewall 134 is protruded from sides of the bottom plate 132. The power supply substrate 120 having the optical package 110, the reflecting plate 140, the light mixing member 150 and the optical sheets 160 are received on the bottom plate 132 of the receiving container 130.

The display unit 200 includes a liquid crystal display (LCD) panel 210, a data tape carrier package (TCP) 220, a gate TCP 230 and an integrated printed circuit board (PCB) 240. The display unit 200 may further include a plurality of data tape carrier packages and a plurality of tape carrier packages.

The LCD panel 210 includes an array substrate 212, a color filter substrate 214 and a liquid crystal layer (not shown). The array substrate 212 includes a plurality of pixels. The color filter substrate 214 corresponds to the array substrate 212. The liquid crystal layer (not shown) is interposed between the array substrate 212 and the color filter substrate 214.

The data tape carrier packages 220 are attached to a source side of the array substrate 212. The gate tape carrier packages 220 are attached to a gate side of the array substrate 212. The data and gate tape carrier packages 220 and 230 applies a driving signal and a timing signal to the LCD panel 210 to control the LCD panel 210.

One end portion of each of the data tape carrier packages 220 is attached to the source side of the array substrate 212, and another end portion of each of the data tape carrier packages 220 is attached to the integrated PCB 240 where the LCD panel 210 is electrically connected to the integrated PCB 240 through the data tape carrier packages 220. The gate tape carrier packages 230 are attached to the gate side of the array substrate 212 where the LCD panel 210 is electrically connected to the integrated PCB 240 through the gate tape carrier packages 230. The integrated PCB 240 applies signals to the data and gate tape carrier packages 220 and 230 based on externally provided electric signals.

The data and gate tape carrier packages 220 and 230 are backwardly bent along the sidewall 194 of the receiving container 190 so that the integrated PCB 240 is on a rear surface of the bottom plate 192 of the receiving container 190.

The top chassis 300 is on the LCD panel 210 to fix the LCD panel 210 to the receiving container 190. The top chassis 300 includes an opening through which a central portion of the LCD panel 210 is exposed. The top chassis 300 is combined with the receiving container 190 to fix the display unit 200 to the receiving container 190.

The backlight assembly 100, the display unit 200 and the top chassis 300 are received in the rear case 400. The front case 500 is on the top chassis 300. The rear case 400 is combined with the front case 500 to complete the display device.

According to an embodiment of the present invention, an optical lens of the button type is a hybrid typed optical lens having a top illumination type and a side illumination type where the area covered by the one LED is increased. In addition, the central portion of the optical lens may have the convex shape including the recessed center. Therefore, the power consumption and a manufacturing cost of the backlight assembly may be decreased, although the display device has the large screen.

This invention has been described with reference to the exemplary embodiments. It is evident, however, that many alternative modifications and variations will be apparent to those having skill in the art in light of the foregoing description. Accordingly, embodiments of the present invention embrace all such alternative modifications and variations as fall within the spirit and scope of the appended claims.

What is claimed is:

1. A display device comprising:
a display panel that displays an image; and
a backlight assembly providing a light to the display panel including:
an optical lens including a central portion having a convex shape with a recessed center, and a peripheral portion having a concave shape,
wherein a height of an outermost side of the peripheral portion being a maximum height of the optical lens,
wherein the convex shape of the central portion comprises a plurality of curved surface having various curvatures, the various curvatures being different from each other, and the concave shape of the peripheral portion comprises a plurality of curved surfaces having various curvatures, the various curvatures being different from each other.

2. The display device of claim 1, wherein the backlight assembly further comprises a diffusion plate that diffuses the light having passed through the optical lens.

3. The display device of claim 1, wherein the backlight assembly further comprises a reflecting plate and a point light source, the reflecting plate interposed between the point light source and the optical lens to reflect a portion of the light leaked from the optical lens.

4. The display device of claim 1, wherein a height of a boundary between the central and peripheral portions is a minimum height of the optical lens.

5. The display device of claim 4, wherein a minimum height of the peripheral portion is about 2.1 mm, and a maximum height of the peripheral portion is about 3.6 mm.

6. The display device of claim 1, wherein the convex shape of the central portion has a recessed center to decrease the luminance in the top direction.

7. The display device of claim 1, wherein a refractive index of each of the central and peripheral portions is about 1.5.

8. The display device of claim 1, wherein the central portion has a substantially circular shape when viewed in the top direction, and the peripheral portion has a substantially donut shape surrounding the central portion.

9. The display device of claim 8, wherein a width of the donut shape of the peripheral portion is not less than a radius of the circular shape of the central portion.

10. The display device of claim 1, wherein the convex shape of the central portion has a recessed center, and the central portion includes:

a first curved surface adjacent to the recessed center having a first radius of curvature of about 2.76 mm, a center of the first radius of curvature being under the first curved surface;

a second curved surface adjacent to the first curved surface having a second radius of curvature of about 1.98 mm, a center of the second radius of curvature being under the second curved surface;

a third curved surface adjacent to the second curved surface having a third radius of curvature of about 2.15 mm, a center of the third radius of curvature being under the third curved surface; and a fourth curved surface adjacent to the third curved surface having a fourth radius of curvature of about 22.97 mm, a center of the fourth radius of curvature being on the fourth curved surface.

11. The display device of claim 1, wherein the peripheral portion comprises:

a fifth curved surface adjacent to the central portion having a fifth radius of curvature of about 13.74 mm, a center of the fifth radius of curvature being on the fifth curved surface; and a sixth curved surface adjacent to the fifth curved surface having a sixth radius of curvature of about 2.70 mm, a center of the sixth radius of curvature being under the sixth curved surface.

12. The display device of claim 1, wherein a radius of the central portion is about 3.5 mm, and a width of the peripheral portion is about 2.5 mm.

13. The display device of claim 1, wherein a recess is formed on a bottom surface of the central portion to receive a point light source.

14. The display device of claim 13, wherein the point light source makes contact with the central portion in the recess.

15. The display device of claim 13, wherein the point light source is spaced apart from the central portion in the recess to form an air layer between the point light source and the central portion.

16. The display device of claim 1, wherein an orientation angle of the light having passed through the optical lens in the top direction is from about −60° to about +60°.

17. The display device of claim 1, wherein an orientation angle of the light having passed through the optical lens in the side direction is from about −80° to about +80.

18. The display device of claim 1, wherein the central portion refracts the light.

19. The display device of claim 1, wherein the peripheral portion internally reflects the light.

* * * * *